(12) United States Patent
Johnson

(10) Patent No.: US 9,725,110 B2
(45) Date of Patent: Aug. 8, 2017

(54) ELECTRICALLY POWERED VEHICLE SYSTEM

(71) Applicant: William Frank Johnson, Cumming, GA (US)

(72) Inventor: William Frank Johnson, Cumming, GA (US)

( * ) Notice: Subject to any disclaimer, the term of this patent is extended or adjusted under 35 U.S.C. 154(b) by 91 days.

(21) Appl. No.: 14/803,488

(22) Filed: Jul. 20, 2015

(65) Prior Publication Data

US 2016/0194023 A1 Jul. 7, 2016

Related U.S. Application Data

(60) Provisional application No. 62/001,309, filed on May 21, 2014.

(51) Int. Cl.
*B62D 1/20* (2006.01)
*B60L 11/18* (2006.01)

(52) U.S. Cl.
CPC ............ *B62D 1/20* (2013.01); *B60L 11/1816* (2013.01)

(58) Field of Classification Search
CPC . B62D 1/20; B62D 15/00; B62D 7/16; B62D 1/265; B62D 1/26; B62D 11/04; B62D 1/02; B62D 7/1545; B60L 11/1816; B61B 15/00; B61B 10/04; B61B 5/00; B61B 5/02; B61B 3/02
USPC ..................... 180/168; 104/304, 288; 191/88
See application file for complete search history.

(56) References Cited

U.S. PATENT DOCUMENTS

| | | | | |
|---|---|---|---|---|
| 1,404,248 A | * | 1/1922 | Van Hooydonk | B60L 5/14 191/88 |
| 3,831,526 A | * | 8/1974 | Howells | B61B 9/00 104/113 |
| 4,791,871 A | * | 12/1988 | Mowll | B60L 5/40 104/88.02 |

* cited by examiner

*Primary Examiner* — Mark Le
(74) *Attorney, Agent, or Firm* — Dunlap Bennett & Ludwig PLLC

(57) ABSTRACT

An electric vehicle is provided. The vehicle includes a frame. A battery and a motor may be secured to the frame, such that the battery powers the motor which drives the vehicle. The vehicle may further include at least one axle including a plurality of wheels. A manual steering mechanism including a steering column is operable to pivot the wheels when the steering column is rotated. An overhead frame protrudes vertically from the main frame. A steering drive shaft is supported by the overhead frame and is operable to pivot the wheels when rotated. A head unit is secured to the steering drive shaft and includes a positive electrode and a negative electrode electrically wired to the battery. The head unit is operable to engage an overhead track. The overhead track transfers electrical power to the positive electrode and negative electrode, thereby recharging the battery and driving the motor while steering the electric vehicle.

11 Claims, 5 Drawing Sheets

ELECTRICALLY POWERED VEHICLE SYSTEM

CROSS-REFERENCE TO RELATED APPLICATION

This application claims the benefit of priority of U.S. provisional application No. 62/001,309, filed May 21, 2014, the contents of which are herein incorporated by reference.

BACKGROUND OF THE INVENTION

The present invention relates to vehicles and, more particularly, to an electric lone occupancy vehicle system.

Traffic congestion is a condition on road networks that occurs as use increases, and is characterized by slower speeds, longer trip times, and increased vehicular queuing. The most common example is the physical use of roads by vehicles. When traffic demand is great enough that the interaction between vehicles slows the speed of the traffic stream, the result is congestion. Further, current vehicles require a large amount of fuel to propel the vehicle even if there is only one occupant. Current efforts to correct traffic gridlock are aimed at public high occupancy vehicles. However, a vast majority of commuters prefer to use their own vehicle.

As can be seen, there is a need for an improved electric vehicle system that eliminates traffic gridlock.

SUMMARY OF THE INVENTION

In one aspect of the present invention, an electrically powered vehicle comprises: a main frame; a battery secured to the main frame; a motor secured to the main frame and powered by the battery; at least one axle comprising a plurality of wheels driven by the motor; a manual steering mechanism comprising a steering column operable to pivot the wheels; an overhead frame protruding vertically from the main frame; a steering drive shaft supported by the overhead frame and operable to pivot the wheels; a head unit secured to the steering drive shaft and comprising a positive electrode and a negative electrode electrically wired to the battery, wherein the head unit is operable to engage an overhead track wherein the overhead track transfers electrical power to the positive electrode and negative electrode, thereby recharging the battery and driving the motor.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a lone occupant electric vehicle that can travel on existing roads or on a lone occupant vehicle thoroughfare where power is provided to propel the vehicle and recharge the battery. The lone occupant vehicle system will eliminate traffic gridlock and reduce fuel needs.

Figure 1:
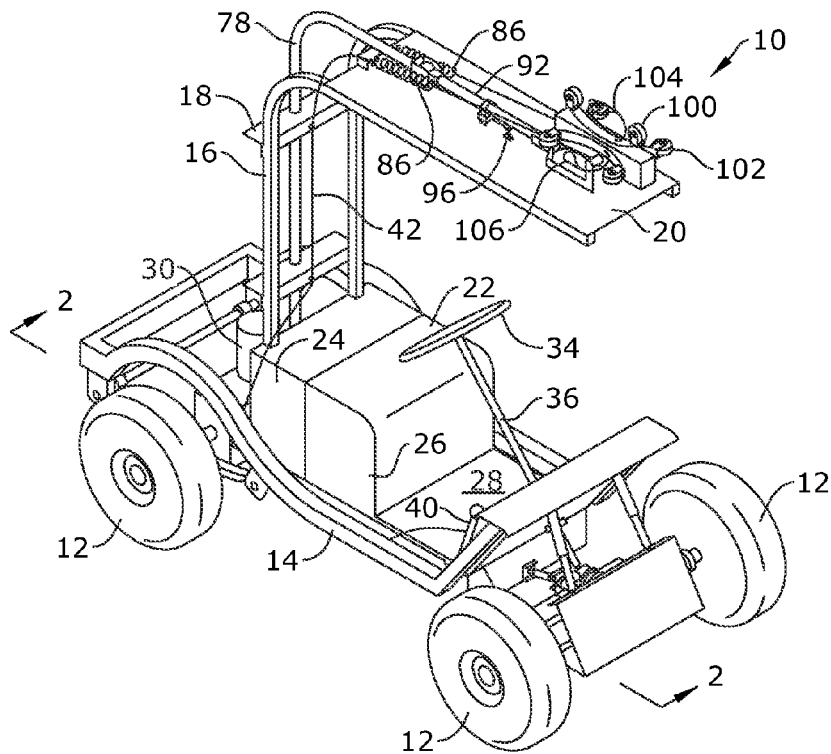
FIG. 1 is a perspective view of an embodiment of the present invention.
Figure 2:
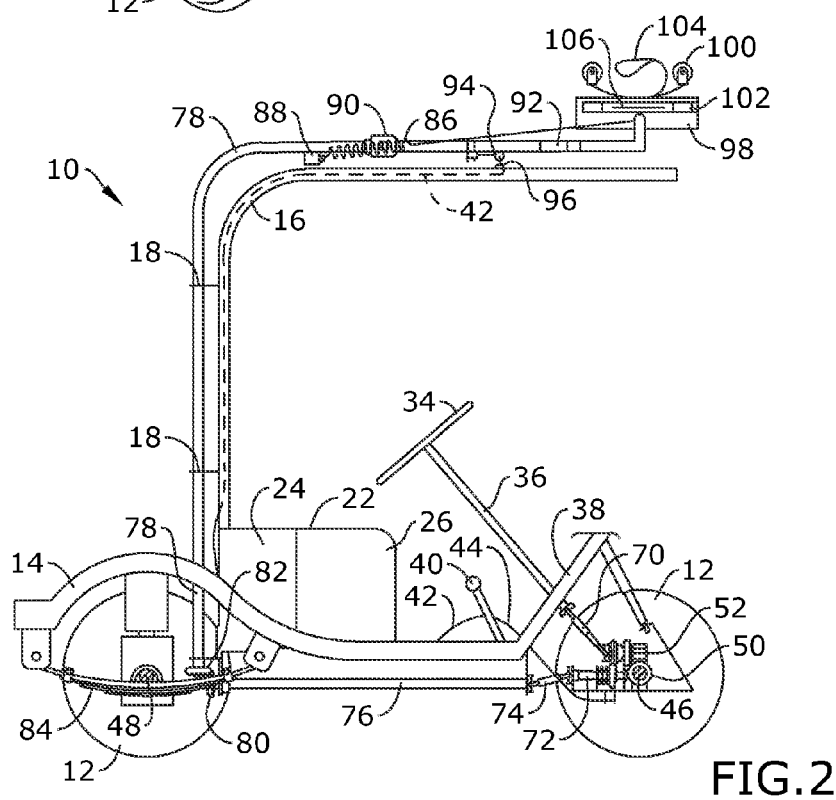
FIG. 2 is a section view of the present invention, taken along line 2-2 in FIG. 1.
Figure 3:
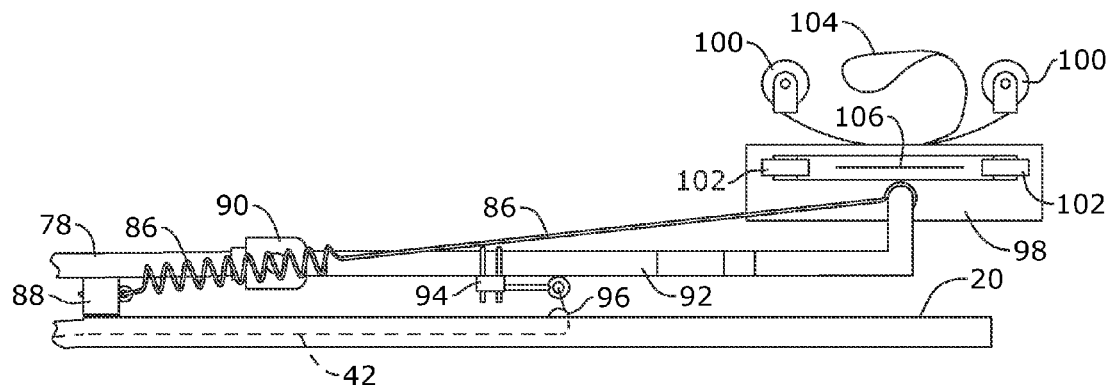
FIG. 3 is a detail section view of an embodiment of the present invention.
Figure 4:
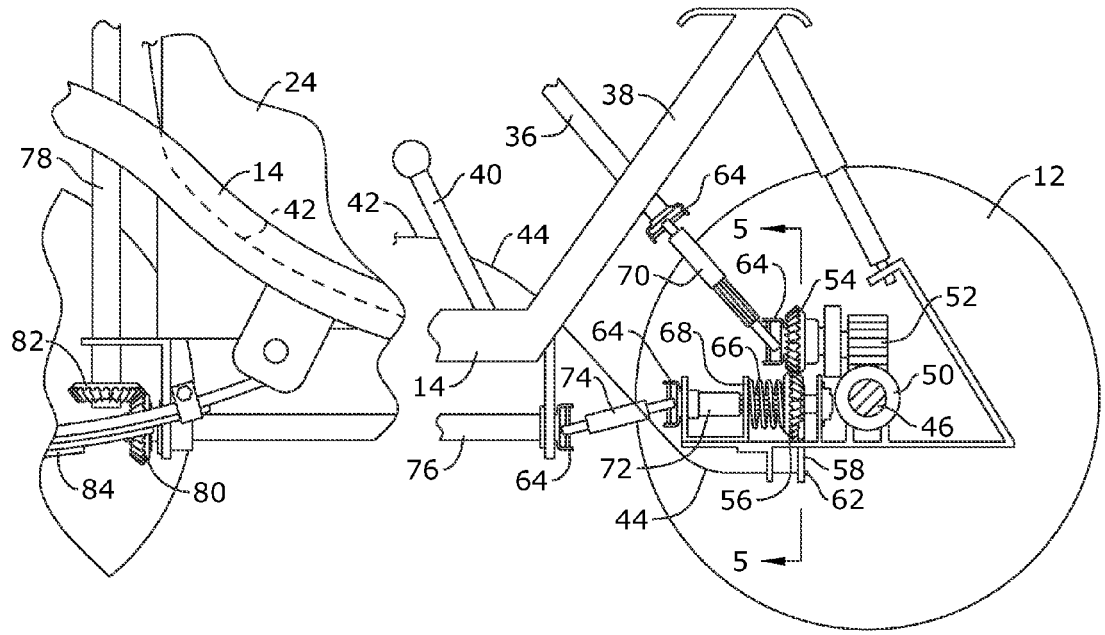
FIG. 4 is a detail section view of an embodiment of the present invention
Figure 5:
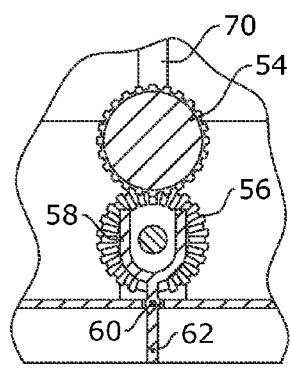
FIG. 5 is a detail section view of the present invention, illustrating the raising of the head unit.
Figure 6:
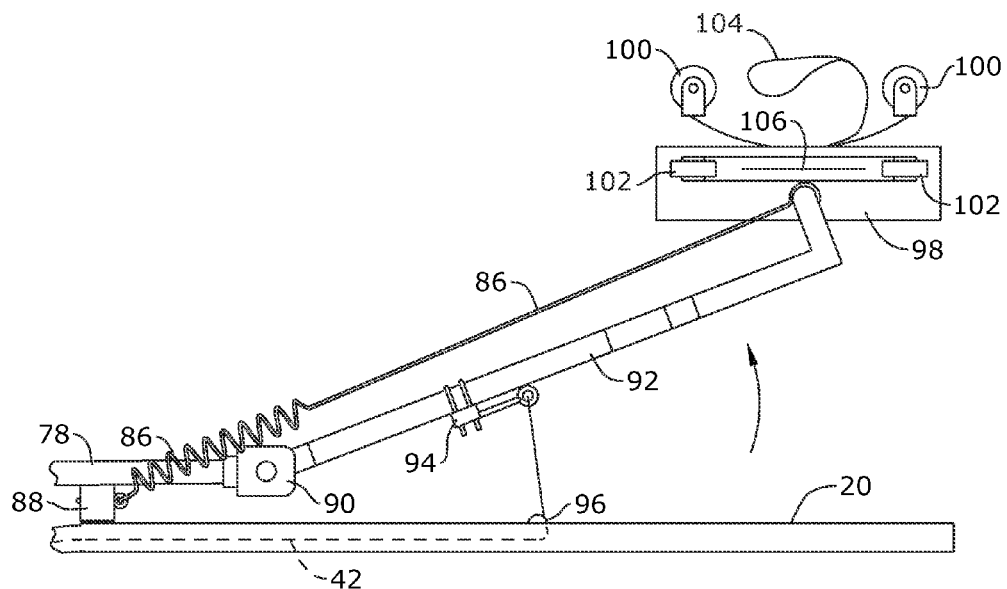
FIG. 6 is a detail section view of the present invention, illustrating the engagement of gears.
Figure 7:
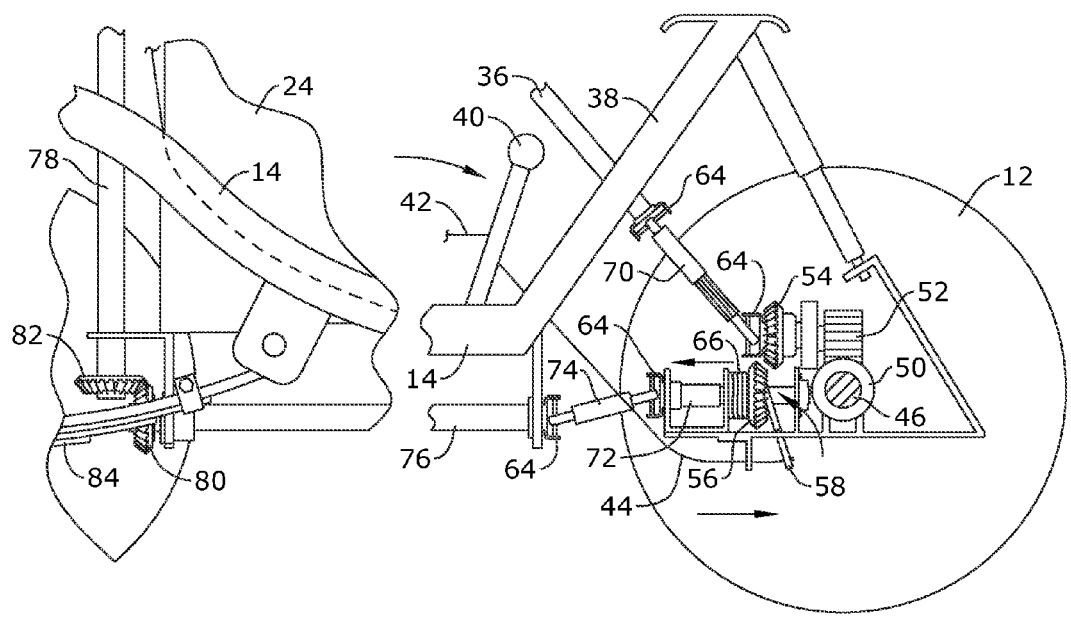
FIG. 7 is a section view of the present invention, taken along line 7-7 in FIG. 6.
Figure 8:
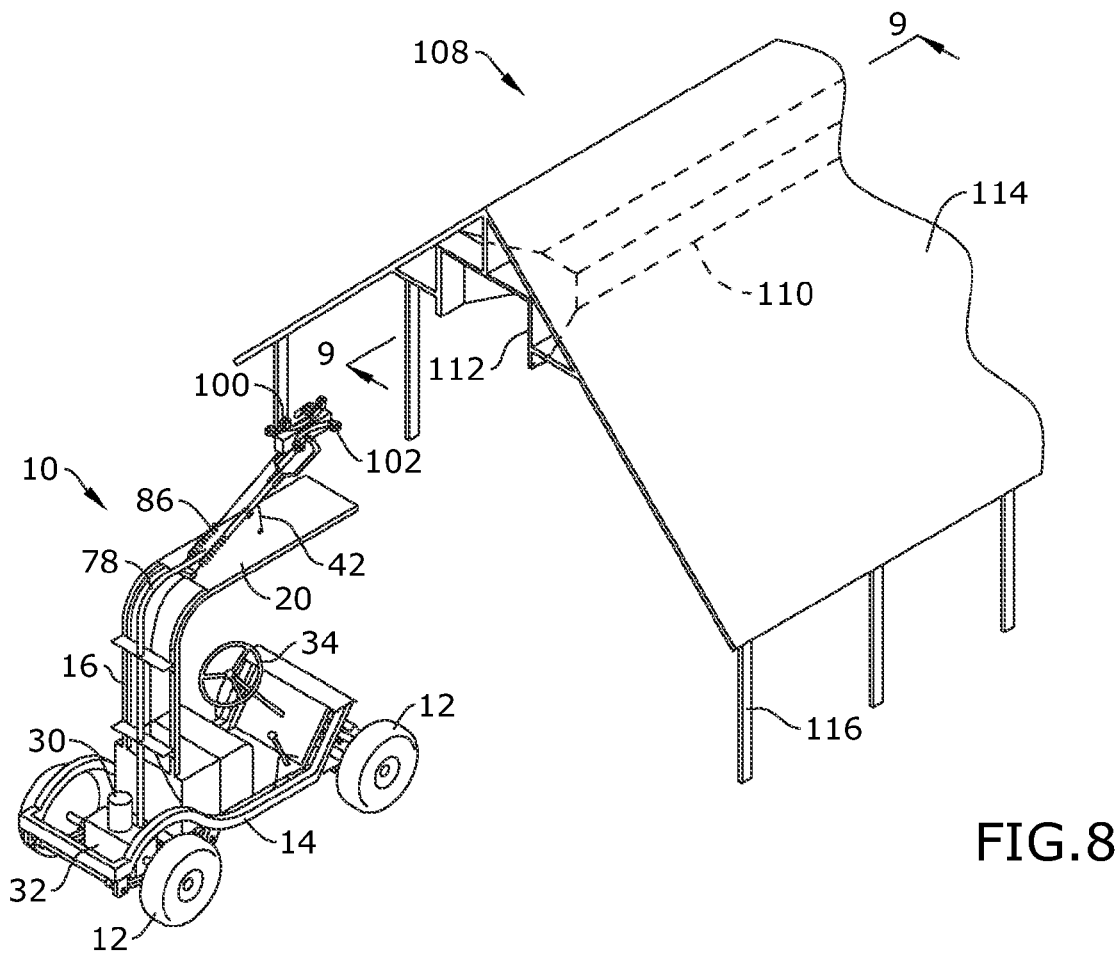
FIG. 8 is a perspective view of the present invention entering the dedicated thoroughfare.
Figure 9:
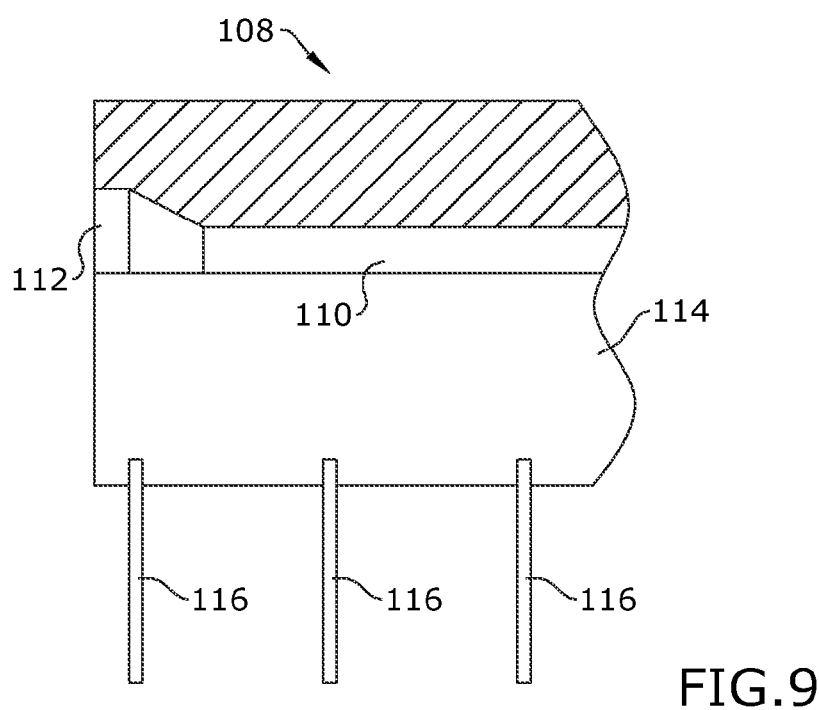
FIG. 9 is a section view of the present invention, taken along line 9-9 in FIG. 8.
Figure 10:
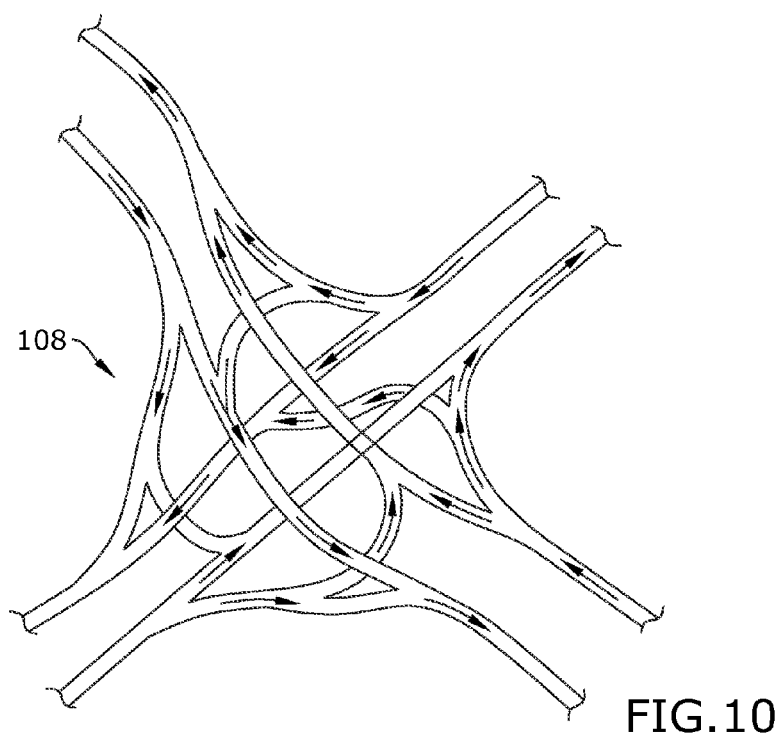
FIG. 10 is a schematic view of a typical dedicated thoroughfare interchange, illustrating exemplary traffic patterns.
Figure 11:
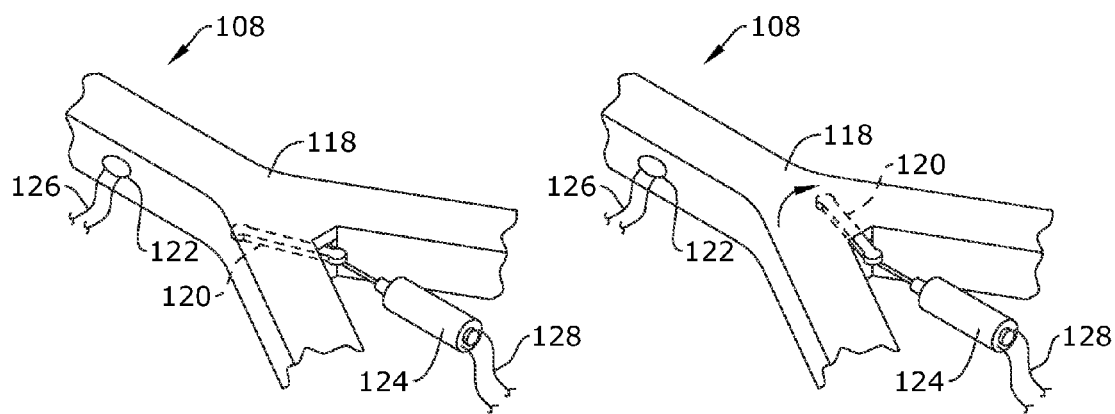
FIG. 11 is a schematic view of an exemplary electronically controlled divert and merge point in the thoroughfare track.

Referring to FIGS. 1 through 11, the present invention includes an electrically powered vehicle 10. The vehicle 10 includes a frame 14. A battery 24 and a motor 30 may be secured to the frame 14, such that the battery 24 powers the motor 30 which drives the vehicle 10. The vehicle 10 may further include at least one axle 46, 48 including a plurality of wheels 12. A manual steering mechanism including a steering column 36 is operable to pivot the wheels 12 when the steering column 36 is rotated.

The present invention further includes an overhead frame 16 protruding vertically from the main frame 14. A steering drive shaft 76, 78 is supported by the overhead frame 16 and is operable to pivot the wheels 12 when rotated. A head unit 98 is secured to the steering drive shaft 76, 78 and includes a positive electrode 104 and a negative electrode 106 electrically wired to the battery 24. The head unit 98 is operable to engage an overhead track 110. The overhead track 110 transfers electrical power to the positive electrode 104 and negative electrode 106, thereby recharging the battery 24 and driving the motor 30.

The present invention may include a lone occupancy vehicle having one seat 22 sized to fit one user. However, in certain embodiments the present invention may service multiple passengers. The vehicle 10 may include similar components as other vehicles made today. For example, the vehicle 10 may include a front axle 46 and a rear axle 48. A pair of front wheels and tires 12 may secure to the front axle and a pair of rear wheels and tires 12 may secure to the rear axle. A charger/motor controller area 26 can be located underneath the seat 22. The vehicle 10 may include leaf springs 84 as a suspension. A roof 20 may be situated to cover and protect the user from the elements. A floorboard 28 may be situated for the user to rest their feet. The motor 30 of the present invention may drive gears within a gear box 32. A drive chain may connect the gears to the wheels 12 and drive the wheels 12.

In certain embodiments, the steering mechanism includes a steering wheel 34 mounted to a steering column 36. The steering column 36 is rotatably attached to a steering column gear 54 by a connector bar 70 secured to the steering column 36 by a U-joint 64 and the steering column gear 54 by a U-joint 64. The steering column gear 54 is fixed to a pinion 52. The pinion 52 interlocks with a rack 50 that pivots the axle 46 or wheels 12. Therefore, a user may rotate the steering wheel 34 in order to manually steer the vehicle 10.

The steering drive shaft 76, 78 may include an upper steering drive shaft 78 and a lower steering drive shaft 76. The upper steering drive shaft 78 is rotatably mounted to the overhead frame 16 by cross members 18 and includes an upper steering gear 82. The lower steering drive shaft 76 is rotatably mounted to the main frame 14 and includes a first lower steering gear 80 and a second lower steering gear 56. The first lower steering gear 80 interlocks with the upper steering gear 82 and the second lower steering gear 56 interlocks with the steering column gear 54 mounted to the steering column 36. Therefore, when the upper steering drive shaft 78 is rotated, the interlocking gears 82, 80 rotate the lower steering drive shaft 76, and the interlocking gears 56, 54 rotate the pinion 52, thereby steering the vehicle 10.

In certain embodiments, the second lower steering gear 56 is attached to the lower steering drive shaft 76 by a first tongue 72 and a second tongue 74. A U-bolt 64 may connect the second tongue 74 to the lower steering drive shaft 76, a U-bolt 64 may connect the second tongue 74 to the first tongue 72 and the first tongue 72 is secured to the second lower steering gear 56. In certain embodiments, a spring plate 68 secures the first tongue 72 to the main frame 14. A spring 66 may be secured around the first tongue 72 in between the spring plate 68 and the second lower steering gear 56. The second lower steering gear 56 is biased to engage the steering column gear 54 by the spring 66.

A lever 40 may be used to engage and disengage the second lower steering gear 56 and the steering column gear 54. A cable 44 connects the lever 40 to a pivot yoke 58. The cable connects to the pivot yoke 58 at a cable connector point 62. The pivot yoke 58 may be pivotally secured to the main frame 14 by a pivot pin 60 and may be adjacent to the second lower steering gear 56. When the lever 40 is pushed forward, the cable 44 may push the pivot yoke 58 to pivot against the second lower steering gear 56 against the bias of the spring 66, thereby disengaging the second lower steering gear 56 from the steering column gear 54. In the disengaged position, the steering drive shaft 76, 78 is no longer engaged and does not steer the wheels 12.

In certain embodiments, the upper steering drive shaft 78 includes a pivoting arm 92 supporting the head unit 98. The pivoting arm 92 is operable to pivot upwards to engage the overhead track 110 and downwards to disengage from the overhead track 110. A clevis 90 may pivotally connect the pivoting arm 92 to the upper steering drive shaft 78. Coil springs 86 may bias the pivoting arm 92 upwards. A first end of the coil springs 86 may secured to a spring anchor 88 attached to the upper steering drive shaft 78 and a second end of the coil springs 86 may be attached to the pivoting arm 92 near the head unit 98. A cable 42 may be secured to the pivoting arm 92 by a cable attachment point 94 and may run through a guide pulley 96 down to a lever 40. A user may push the lever 40 which pulls the cable 42 to pivot the pivoting arm 92 downwards against the bias of the spring 86. The user may then pull the lever 40 which releases the cable 42 to allow the pivoting arm 92 to pivot upwards.

When the pivoting arm 92 is pivoted upwards, the head unit 98 may engage the overhead track 110. In certain embodiments, the head unit 98 may include top wheels 100 and side wheels 102 so that the head unit 98 slidably engages the overhead track 110. The overhead track 110 may be part of a dedicated thoroughfare 108. The dedicated thoroughfare 108 may include a roof 114 in which the overhead track 110 is secured. Supports 116 may support the roof 114. A widened entrance 112 may be formed at the entrance of the overhead track 110 so that users may easily enter the dedicated thoroughfare 108 to engage the head unit 98 with the overhead track 110.

During use, the vehicle 10 may be driven from a user's home to the thoroughfare 108. When outside of the thoroughfare 108, the lever 40 may be pushed forward. The pushed forward lever 40 pivots the pivot yoke 58, thereby disengaging the second lower steering gear 56 and the steering column gear 54. Therefore, only the steering column 36 has control of the steering of the vehicle. The battery 24 may be charged and the user may drive the vehicle 10 to a widened entrance 112 of the dedicated thoroughfare 108. The user may then pull the lever 40 back, which may release the pivot yoke 58, allowing the second lower steering gear 56 to bias against the steering column gear 54. Further, the pivoting arm 92 pivots upwards due to the coil springs 86. The user drives into the dedicated thoroughfare 108 so that the head portion 98 engages and is within overhead track 110. While the vehicle 10 is within the overhead track 110, the battery 24 may be recharged and the motor 30 may be driven by the power from the overhead track 110. Since the second lower steering gear 56 and the steering column gear 54 are engaged, when the vehicle 10 runs through a turn in the dedicated thoroughfare 108 the steering drive shaft 76, 78 may rotate, thereby steering the wheels 12 of the vehicle 10 with the turn.

In certain embodiments, the vehicles 10 may include a sensor, such as an optical sensor. The optical sensor may be positioned at the front of the vehicle 10. If two vehicles 10 are approaching one another, the optical sensor may sense the other vehicle 10 and signal the motor controller to reverse the charge to avoid a collision. To divert from one exit of the dedicated thoroughfare 108 to another, such as within a Y-intersection 118, a light emitting diode may be mounted on the head unit 98. The user may activate the light emitting diode to signal a sensor 122 within the dedicated thoroughfare 108. The sensor 122 activates a solenoid 124 which pivots a bar 120 one way or another depending on the output of the light emitting diode.

To control the speed of the vehicles 10, an emitter may be placed on the head unit 98, which sends pulses to a compare circuit in the motor controller created by a barcode in the dedicated thoroughfare 116. The pulses are compared to the pulses from a clock in the motor controller. To accelerate, the bars may be further apart and to decelerate the bars may be closer together on the bar code. The barcodes may be displayed to vehicles 10 at intersections and merging lanes to prevent collisions and create gaps between the vehicles 10.

It should be understood, of course, that the foregoing relates to exemplary embodiments of the invention and that modifications may be made without departing from the spirit and scope of the invention as set forth in the following claims.

What is claimed is:

1. An electrically powered vehicle comprising:
   a main frame;
   a battery secured to the main frame;
   a motor secured to the main frame and powered by the battery;
   at least one axle comprising a plurality of wheels driven by the motor;
   a manual steering mechanism comprising a steering column operable to pivot the at least one axle;

an overhead frame protruding vertically from the main frame;

a steering drive shaft supported by the overhead frame;

a lever operable to engage and disengage the steering drive shaft from the at least one axle, wherein when the steering drive shaft is engaged with the at least one axle, the steering drive shaft is operable to pivot the at least one axle; and a head unit secured to the steering drive shaft and comprising a positive electrode and a negative electrode electrically wired to the battery, wherein the head unit is operable to engage an overhead track wherein the overhead track transfers electrical power to the positive electrode and negative electrode, thereby recharging the battery and driving the motor.

2. The electrically powered vehicle of claim 1, further comprising a steering wheel attached to the steering column.

3. The electrically powered vehicle of claim 1, wherein the steering drive shaft comprises an upper steering drive shaft and a lower steering drive shaft, wherein the upper steering drive shaft is rotatably mounted to the overhead frame and comprises an upper steering gear, wherein the lower steering drive shaft is rotatably mounted to the main frame and comprises a first lower steering gear and a second lower steering gear, wherein the first lower steering gear interlocks with the upper steering gear and the second lower steering gear interlocks with a steering column gear mounted to the steering column.

4. The electrically powered vehicle of claim 3, wherein the lever is operable to engage and disengage the second lower steering gear and the steering column gear.

5. The electrically powered vehicle of claim 4, wherein the second lower steering gear is biased to engage the steering column gear by a spring.

6. The electrically powered vehicle of claim 5, further comprising a cable connecting the lever to a pivot yoke, wherein the lever is operable to pivot the pivot yoke via the cable so that the pivot yoke pushes the second lower steering gear against the bias of the spring, thereby disengaging the second lower steering gear and the steering column gear.

7. The electrically powered vehicle of claim 1, wherein the steering drive shaft comprises a pivoting arm supporting the head unit, wherein the pivoting arm is operable to pivot upwards to engage the overhead track and downwards to disengage from the overhead track.

8. The electrically powered vehicle of claim 7, further comprising coil springs biasing the pivoting arm upwards.

9. The electrically powered vehicle of claim 8, further comprising a lever and a cable connecting the lever to the pivoting arm, wherein the lever is operable to pull the cable to pivot the pivoting arm downwards against the bias of the spring and release the cable to allow the pivoting arm to pivot upwards.

10. The electrically powered vehicle of claim 1, wherein the head unit comprises a plurality of wheels to engage the overhead track.

11. An electrically powered vehicle comprising:

a main frame;

a battery secured to the main frame;

a motor secured to the main frame and powered by the battery;

at least one axle comprising a plurality of wheels driven by the motor;

a manual steering mechanism comprising a steering column operable to pivot the at least one axle, wherein the steering column comprises a steering column gear;

an overhead frame protruding vertically from the main frame;

an upper steering drive shaft and a lower steering drive shaft, wherein the upper steering drive shaft is rotatably mounted to the overhead frame and comprises an upper steering gear, wherein the lower steering drive shaft is rotatably mounted to the main frame and comprises a first lower steering gear and a second lower steering gear, wherein the first lower steering gear interlocks with the upper steering gear and the second lower steering gear interlocks with the steering column gear; and a head unit secured to the steering drive shaft and comprising a positive electrode and a negative electrode electrically wired to the battery, wherein the head unit is operable to engage an overhead track wherein the overhead track transfers electrical power to the positive electrode and negative electrode, thereby recharging the battery and driving the motor.

* * * * *